(12) United States Patent
Layher et al.

(10) Patent No.: US 8,062,100 B2
(45) Date of Patent: Nov. 22, 2011

(54) WATER SUPPLY FOR A HAND-HELD POWER TOOL

(75) Inventors: Wolfgang Layher, Waiblingen (DE); Klaus-Martin Uhl, Plochingen (DE); Sebastian Hansen, Besigheim (DE); Frank Berbig, Leipzig (DE); Daniel Herbst, Karlsruhe (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 12/536,508

(22) Filed: Aug. 6, 2009

(65) Prior Publication Data
US 2009/0293282 A1      Dec. 3, 2009

Related U.S. Application Data

(62) Division of application No. 11/306,873, filed on Jan. 13, 2006, now abandoned.

(30) Foreign Application Priority Data

Jan. 17, 2005  (DE) .......................... 10 2005 002 125

(51) Int. Cl.
*B24B 55/02* (2006.01)
*E03B 1/00* (2006.01)
*B28D 1/06* (2006.01)

(52) U.S. Cl. .................. 451/450; 137/614.19; 137/560; 125/13.01

(58) Field of Classification Search .................. 251/7, 9; 451/450; 125/13.01; 137/560, 614.19
See application file for complete search history.

(56) References Cited

U.S. PATENT DOCUMENTS

| 4,033,077 | A | * | 7/1977 | Chester et al. ................. 451/359 |
| 4,102,084 | A | * | 7/1978 | Bloomquist .................. 451/357 |
| 5,605,496 | A | * | 2/1997 | Pickard ........................... 451/90 |

* cited by examiner

Primary Examiner — John Rivell
Assistant Examiner — Atif Chaudry
(74) Attorney, Agent, or Firm — Gudrun E. Huckett

(57) ABSTRACT

A water supplying device of a hand-held power tool has a water-conveying line and a valve arrangement arranged in the line for controlling the water flow through the line. The valve arrangement has a control valve with a valve body adjustable across a positioning travel. The opening cross-section of the control valve, as a function of the positioning travel, has a progressive characteristic line. An arrangement for actuating the water supplying device has an actuator that is separate from additional control elements of the power tool.

11 Claims, 10 Drawing Sheets

Fig. 10
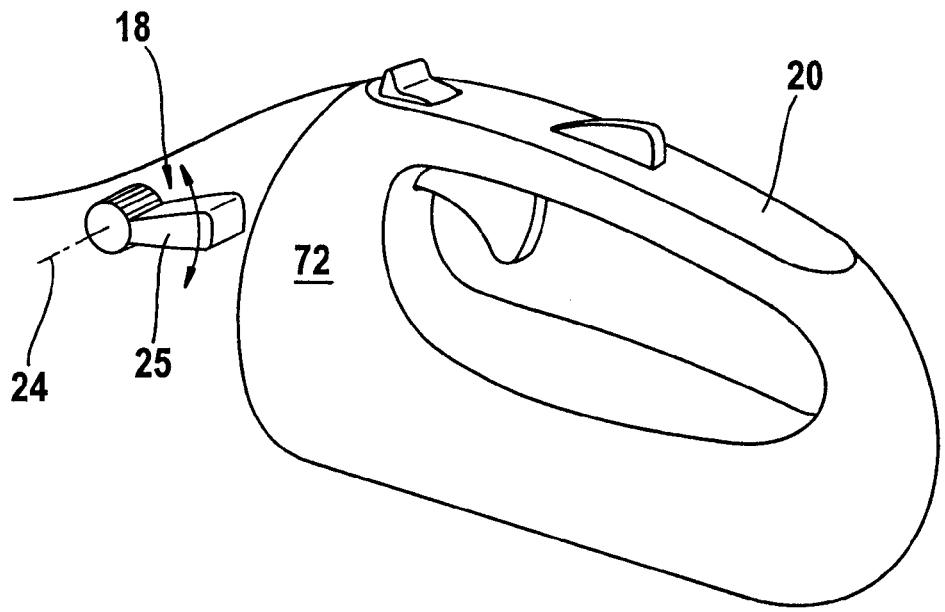
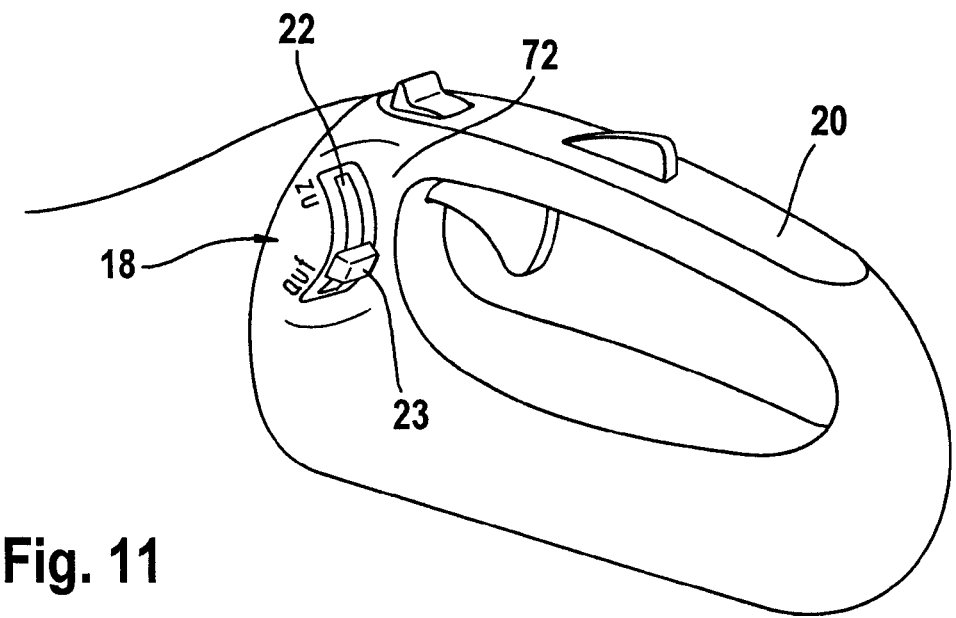
Fig. 11

WATER SUPPLY FOR A HAND-HELD POWER TOOL

The present invention is a divisional application of U.S. application Ser. No. 11/306,873, the entire disclosure of which is incorporated herein by reference, having a filing date of 13 Jan. 2006 and claiming priority to German patent application 10 2005 002 125.5 having a filing date of 17 Jan. 2005.

BACKGROUND OF THE INVENTION

The invention relates to a water supplying device of a hand-held power tool, in particular for supplying a cutting wheel of a cut-off machine with water. The water supplying device comprises a water-conveying line and a valve arrangement arranged in the line for controlling a water flow through the line. The valve arrangement comprises a control valve with a valve body adjustable across a positioning travel.

The invention also relates to an arrangement for actuating a water supplying device of a hand-held power tool for actuating a device for supplying water of the aforementioned kind, the arrangement comprising an actuator acting on the valve arrangement.

Hand-held power tools comprising a water supply through which, for example, cooling water is supplied to the tool of the power tool and/or to the workpiece are known. Particularly in the case of a hand-held cut-off machine, the cutting wheel can be supplied with water for binding dust produced when performing a cut.

The control or regulation of the supplied amount of water is not satisfactory in the known embodiments. By means of an external valve, the water flow can be released before beginning the work to be performed and can be interrupted after completion. After release of the water flow, the water flows to the location to be worked on even when the power tool is not in operation. Before and after the actual working steps as well as during short work interruptions, unwanted quantities of water escape that, in addition to increasing water usage, also compromise the location to be worked on with an unnecessary quantity of water.

U.S. Pat. No. 6,442,841 B1 discloses an arrangement with a device for supplying water to a hand-held power tool in which a shut-off valve for opening or closing a water line is provided. The shut-off valve is actuatable by means of a throttle trigger lock with which also the throttle trigger for adjusting the output of the drive motor can be released. By actuating the throttle trigger lock, a water supply is provided only when readiness to operate the power tool with power is indicated by releasing the throttle trigger.

A disadvantage of the disclosed arrangement is that, for example, when opening the throttle for warming up the drive motor during cold start, water can be released even when no working process is to be performed. Adjustment of the water flow rate is difficult as is the adjustment in regard to different water pressure available at the intake. Coupling the throttle trigger lock to the shut-off valve causes the basic function of the power tool, such as simple acceleration or performing a dry cut, to be made difficult when the valve is dirty, stiff and/or damaged.

It is an object of the present intention to provide a water supplying device of a hand-held power tool that enables improved adjustment of the conveyed amount of water to the actual water demand.

The invention further has the object to provide an arrangement for actuating the aforementioned device which arrangement enables an improved control of the water supply.

SUMMARY OF THE INVENTION

According to the present invention, this object is solved in regard to the water supplying device that the opening cross-section of the control valve, as a function of the positioning travel, has a progressive characteristic line.

According to the present invention, this object is solved in regard to the arrangement in that the actuator is configured separate from additional control elements of the power tool.

A water supplying device of a hand-held power tool comprising a water-conveying line and a valve arrangement arranged in the line is proposed wherein the valve arrangement comprises a control valve with a valve body that is adjustable across a positioning travel. In this connection, an opening cross-section of the control valve has, depending on the positioning travel, a progressive characteristic line. By means of suitable actuating means the valve body can be moved into any position within its positioning travel so that the corresponding opening cross-section can be adjusted. The flow rate of the water flow is thus adjustable as needed. The progressive characteristic line enables alternatively a connection of water sources of different pressure wherein the flow rate can be finally adjusted with the same valve without additional devices. The progressive characteristic line leads to a significant positioning travel being required for moving the valve body away from its rest position in order to release a comparatively minimal opening cross-section. For a water supply at high pressure, for example, from a waterline network, the required water flow can be adjusted finely. Alternatively, a water supply can be provided, for example, from a separate water container wherein the water container is arranged at a certain height relative to the power tool. The height difference between the water container and the power tool effects a static pressure which is sufficient for water conveying. The absolute value of the water pressure is however comparatively minimal. A finely adjustable control of the water flow at a corresponding minimal pressure is possible by opening the control valve farther wherein the progressive characteristic line within the range of the predetermined positioning travel enables a correspondingly large opening cross-section. As a whole, the required conveying rate can be adjusted precisely to the water demand that is required respectively with simple means without requiring switching devices or the like to different pressure supply systems.

In an advantageous embodiment, the control valve is configured such that the progressive characteristic line has two at least approximately linearly extending portions that are preferably progressively angled relative to one another. A first comparatively flat portion of the characteristic line is adjustable to a water supply at high pressure wherein the linear course enables control characteristics for the user that are finely adjustable and predictable. The same holds true essentially also for the second steeper characteristic line portion where the steepness in a simple way enables its use with a low-pressure water supply, for example, from a transport container, without requiring pumps or the like.

The control valve is expediently configured as a globe valve with a straight positioning travel. The configuration as a globe valve with linear actuation is not sensitive with regard to soiling and requires only minimal adjusting forces even at high water pressures while fulfilling corresponding seal tightness requirements.

The control valve is particularly designed such that the valve body is configured to have an opening action away from its rest position that is neutral relative to admission pressure of the water pressure at the supply side. The required actuating forces are at least approximately independent of the water pressure that is present. Because of the at least approximately constant actuating forces that can be sensed by the user, an excellent adjustability of the water flow independent of the water pressure that is present is promoted.

In an expedient embodiment the control valve also provides a shut-off valve. For example, the positioning travel of the valve body is selected such that the control valve in one end position is closed and, starting from this closed end position, an increasing progressive opening action can be realized. In this way, a simple, cost-saving and space-saving configuration is provided without requiring a separate shut-off valve. In an expedient alternative, the shut-off valve is connected in series to the control valve in flow communication within the valve arrangement and, in particular, is arranged upstream of the control valve. In the closed state of the shut-off valve the control valve is pressureless. The control valve can be adjusted in the desired way with minimal actuating forces without the water pressure having an effect.

In an expedient embodiment the shut-off valve is a solenoid valve that is in particular a 2/2-way valve. The solenoid drive can be coupled, for example, with an ignition coil of the internal combustion drive engine or the like so that the water supply is automatically switched on, as is desired, only when the power tool is started and is also automatically switched off after shutting down the power tool.

In an advantageous variant, the shut-off valve is a mechanical valve with pneumatic control. For actuation, a pressure that is generated by the power tool and in particular by the drive motor can be used so that in this way an automatic on/off switching coupled, as is desired, to the operation of the power tool is provided. A manual operation of additional actuating elements is not required. Coupling of the water flow to the operation of the power tool or of the drive motor prevents unnecessary water discharge.

For driving the pneumatically controlled valve, a diaphragm loadable with pressure can be used in particular. The correspondingly designed large-surface area diaphragm enables, for example, in connection with a lever mechanism, correspondingly high actuating forces while requiring only a minimal pressure difference. Minimal operating pressures, for example, the crankcase pressure that is taken from the crankcase of an internal combustion engine provided as a drive or the intake vacuum in the area of the carburetor can be sufficient for actuating the valve.

As a pneumatic control signal, advantageously an operating signal of the internal combustion drive engine is connected to the valve wherein the operating signal preferably is the crankcase pressure of the internal combustion engine. The release of the water flow is thus coupled to the operation of the internal combustion engine. An accidental water discharge before or during the starting process is prevented.

The valve arrangement has advantageously a hose clamp that is especially embodied as a roller clamp. Such clamps are simple in regard to their configuration and robust and a have a long service life.

An arrangement for actuating a water supplying device of a hand-held power tool is proposed that comprises a valve arrangement and an actuator acting on the valve arrangement, wherein the actuator is configured to be separate from additional control elements of the power tool. By means of the additional control elements, an internal combustion engine of the power tool or also an electric drive motor can be actuated, for example, without this mandatorily causing the water supply to be activated also. Warming up the drive motor is possible as well as performing a dry cut without this requiring that a connected water supply be interrupted beforehand. A change between two operating modes is possible without problems even during operation. Independent of the operation of the power tool, the water supply can be released or interrupted precisely when this is deemed necessary by the user by actuating the separate actuator.

In an advantageous further embodiment the actuator comprises an actuating element for actuating the control valve and, separate therefrom, an on/off switch for actuating the shut-off valve. A separate actuation of the control valve and of the shut-off valve is possible in that, for example, the control valve beforehand is adjusted to a desired position for a desired water flow while in operation of the power tool only the shut-off valve is actuated as needed for releasing or interrupting the water flow.

In an expedient embodiment, the power tool has a first handle with the additional control elements for operating the power tool, wherein at least a part of the actuator for the valve arrangement is arranged on this first handle or at least in the area of the first handle. The handle can be gripped by one hand of the operator wherein, as needed, without having to reposition the hand, the corresponding control elements and also the actuator for the water supply can be actuated. The power tool can be moved into the position required for working wherein it is possible to release the water flow just immediately before performing the work to be performed. Preparatory work such as starting the drive motor as well as warming up the motor can be performed in the desired way without water supply. Without repositioning the hand, a readjustment of the supplied water quantity can be realized also on the work-ready power tool in addition to releasing or interrupting the water supply.

In this connection, the actuator is in particular arranged in the lateral forward area of the first handle. This provides easy accessibility by the thumb of the hand that grips the handle. The position relative to the thumb enables the application of comparatively high actuating forces without impairing during operation a secure gripping action on the handle.

In an expedient embodiment, the actuator has a rotatable setting roller. The setting roller is actuated essentially by the force of a thumb or finger applied to its cylindrical surface. By repeated actuation, it is possible to achieve large positioning travels or large positioning angles with only minimal force expenditure.

In another expedient variant, the actuator comprises a setting slide that is guided in a groove, particularly in a pivotable way. The travel of the setting slide is easily visible for the operator by the course of the groove wherein the position of the setting slide relative to the groove is an easily recognizable indicator for the selected valve position.

Expediently, the actuator comprises a setting lever that with its axis of rotation projects at least partially outwardly. By applying a pressure on the setting lever, comparatively high forces can be applied wherein, for example, in the case of repair work in connection with dirty or damaged valves, the axle can be engaged by a tool.

In a further expedient embodiment, the adjustor has an axially movable actuating knob. The adjusting know is in particular suitable as an on/off switch and, by means of its easily detectable position, provides unquestionable information in regard to the selected valve position.

The actuating knob can advantageously be a part of the on/off switch in the form of a push button that can be switched between two switching positions for actuating the shut-off valve. The shut-off valve can be switched on and off by repeated pushing of the switchable pushbutton in an ergonomic way similar to the mechanics of a ballpoint pen.

Expediently, the actuating element for actuating the control valve is arranged in the area of the pushbutton, in particular so as to annularly surround the pushbutton. At the same location, the required amount of water can be readjusted with the annular actuating element without repositioning the hand. Subsequently, as needed, by actuating the pushbutton the readjusted water flow can be released or interrupted. This results in the a compact configuration in particular in connection with the above described global valve that has a simple configuration and is easy to actuate.

In an advantageous variant, the control device is configured as a pivot lever that projects from a surface of the handle and, in particular, from the bottom side of the handle. The power tool can be picked up by gripping the handle and can be started. During operation, the pivot lever is in the area of the fingers that grip the handle and can be actuated as needed for releasing a water flow without repositioning the hand.

It can also be expedient that when the power tool is designed to have a second handle, at least a part of the actuator is arranged on this second handle. Because of the spatially separate correlation of the different control and actuating means to the different handles, confusing the individual actuating elements can be prevented; however, the actuator is still arranged in direct vicinity of the hand guiding the power tool. For example, the control elements for the motor are correlated with the first handle and the actuating elements for controlling the water flow are correlated with the second handle. Both control and actuating elements can be actuated without repositioning the hand during or after operation of the power tool.

In an advantageous configuration the on/off switch is arranged such that an actuation is coupled to readiness of operation or to the operation of the power tool. In an embodiment suitable for this purpose, the on/off switch is, for example, actuatable by the weight of the power tool. In particular, the on/off switch is arranged in the area of a support surface of the power tool. When setting down the power tool, the weight actuates the switch such that water supply is interrupted. By lifting the power tool, its readiness for operation is signalized; the switch that is now relieved of the weight of the power tool releases the water flow. An automatic water control is provided that prevents faulty manual operation.

In an advantageous variant of this concept, the on/off switch is configured as a push switch that is integrated into the surface of the handle. When starting the power tool, the handle is gripped by a hand of the operator and the push switch is thus actuated automatically without further action being required. The power tool can be carried by the other handle without releasing the water supply. In preparation of work to be performed, the handle provided with the push switch can be gripped so that the water supply its triggered. In this way, there is also an automatic coupling to the operational readiness of the power tool so that faulty manual operation is prevented.

It can also be expedient to actuate the on/off switch by means of a part of the power tool that is moved upon operation of the power tool. In this connection, it can be provided in particular that the on/off switch is a magnetic clutch coupled to the part of the power tool that rotates upon operation. By means of the rotating drive motor or by means of a rotating tool, e.g. in connection with a centrifugal clutch, a moment can be generated through the magnetic clutch as a result of operation that is suitable for triggering the shut-off valve. In an advantageous variant, the on/off switch is actuatable by a circulating belt drive of the power tool. In a further advantageous variant, the on/off switch is actuatable by a vane that is loaded by an airflow generated by a fan wheel of the drive motor. The aforementioned variants can be constructed with simple means and can be designed such that an actuation of the connected valve is realized only at a certain engine speed. This engine speed can be adjusted such that idle or partial load operation is possible without triggering a water supply. An automated water supply is realized only upon reaching a predetermined working speed so that the water supply is coupled directly to performing the working process. An unnecessary water discharge is prevented.

BRIEF DESCRIPTION OF THE DRAWINGS

Embodiments of the invention will be explained in the following with the aid of the drawing.

FIG. 10 shows a further variant of the arrangements according to FIG. 8 and FIG. 9 with an actuating element configured as a pivotable setting lever.

FIG. 11 is an embodiment with an actuating element embodied as a setting slide.

DESCRIPTION OF PREFERRED EMBODIMENTS

Figure 1:
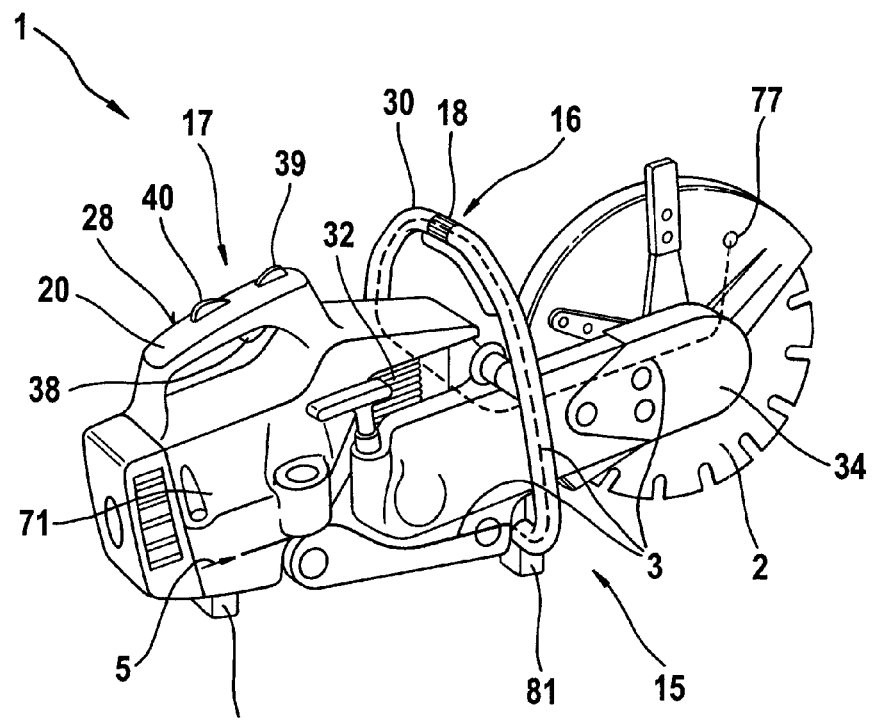
FIG. 1 is a perspective overview illustration of a power tool exemplified by a cut-off machine with a device for supplying water.

FIG. 1 shows in a perspective overview illustration a power tool 1 exemplified by a hand-held cut-off machine. The cut-off machine has a drive motor 32 embodied as an internal combustion engine by means of which a cutting wheel 2 can be driven by a belt drive 34. The power tool can also be a power drill or another comparable hand-held power tool. The drive motor 32 can also be configured as an electric motor.

For guiding the power tool 1, a first handle 20 is provided on a handle housing 71 and a second handle 30 is provided that is positioned in front of the first handle 20 in the direction toward the cutting wheel 2. The second handle 30 is embodied in the illustrated embodiment as a grip pipe. The power tool 1 has a support surface 80 with support legs 81 for setting it down.

For actuating and for controlling the drive motor 32, a number of control elements 17 are provided of which a throttle trigger 38, a stop lever 39 as well as a throttle trigger lock 40 are arranged on the first handle 20.

For supplying water to the cutting wheel 2, the power tool 1 has a water supplying device 15 with which, as needed, a water flow 5 is conducted through a line 3 to the cutting wheel 2. In the illustrated embodiment, the line 3 extends through the second handle 30 embodied as a grip pipe, wherein for controlling the water flow an actuator 16 is provided in the second handle. The actuator 16 is embodied as an annular actuating element 18 that is rotatable about the pipe axis of the tubular handle 30 for adjusting as needed the water quantity flowing through.

Figure 2:
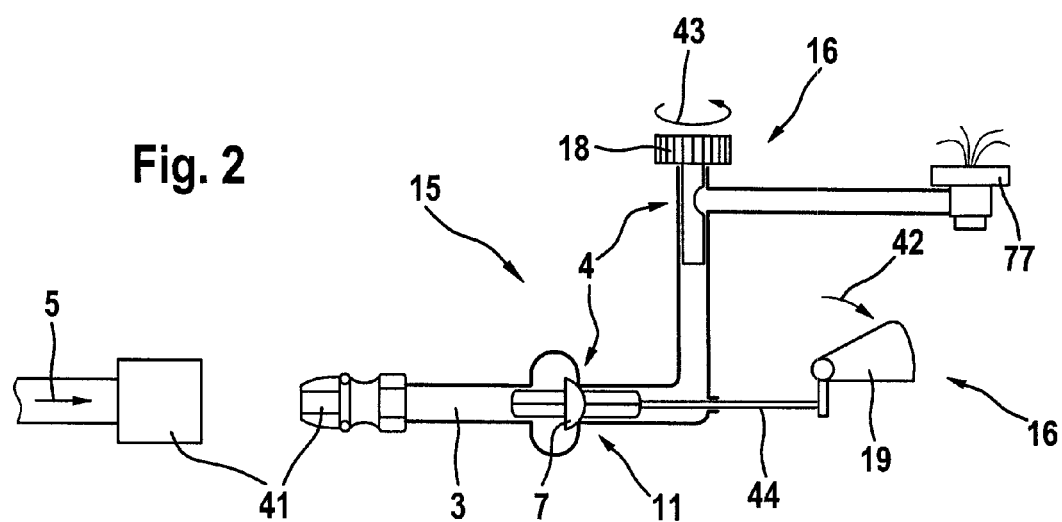
FIG. 2 is a schematic overview illustration of an embodiment of the water supply according to FIG. 1.

FIG. 2 shows in a schematic illustration an embodiment of the water supplying device 15 according to FIG. 1 with a valve arrangement 4 that comprises a control valve 6 and a shut-off valve 11 arranged in series upstream of the control valve 6. The control valve 6 and the shut-off valve 11 are arranged in the line 3 and are provided for controlling or adjusting the water flow 5. At the supply side of the line 3, a hose coupling 41 is provided with which, alternatively, a transportable water container or, by means of a hose, a pressurized waterline network can be connected.

The shut-off valve 11 has a valve body 7 that can be actuated by means of a push rod 44 via an on/off switch 19. By pressing down the on/off switch in the direction of arrow 42, the valve body 7 is lifted against the water pressure at the supply-side so that the flow path is released by the shut-off valve 11. Intermediate positions between an open position and a closed position of the shut-off valve 11 are not provided. Instead, the shut-off valve 11 is provided in the sense of an on/off function for releasing or interrupting the water flow 5.

The magnitude of the water flow 5 resulting in the open position of the shut-off valve 11 can be controlled by means of the control valve 6. For this purpose, an actuating element 18 is provided that acts on the control valve and in the illustrated embodiment is rotatable in the direction of arrow 43 so that the control valve 6 can be moved into any desired flow rate position. The adjustment of the control valve 6 can be realized in particular in the closed position of the shut-off valve 11 in which position the control valve 6 is pressureless. In the open position of the shut-off valve 11, the water flow 5 flows through line 3 at a flow volume that is predetermined by the position of the control valve 6. The water flow 5 is guided by means of the line 3 through an injection nozzle 77 to the cutting wheel 2 (FIG. 1).

In the illustrated embodiment, the actuating element 18 and the on/off switch 19 are separately configured and enable independent actuation. The on/off switch 19 and the actuating element 18 are part of the actuator 16 that acts on the valve arrangement 4 and are both independent of the additional control elements 17 (FIG. 1). It can also be expedient that such an independent configuration is provided only for the actuating element 18 while the on/off switch 19 is, for example, formed by the throttle trigger lock 40 (FIG. 1).

Figure 3:
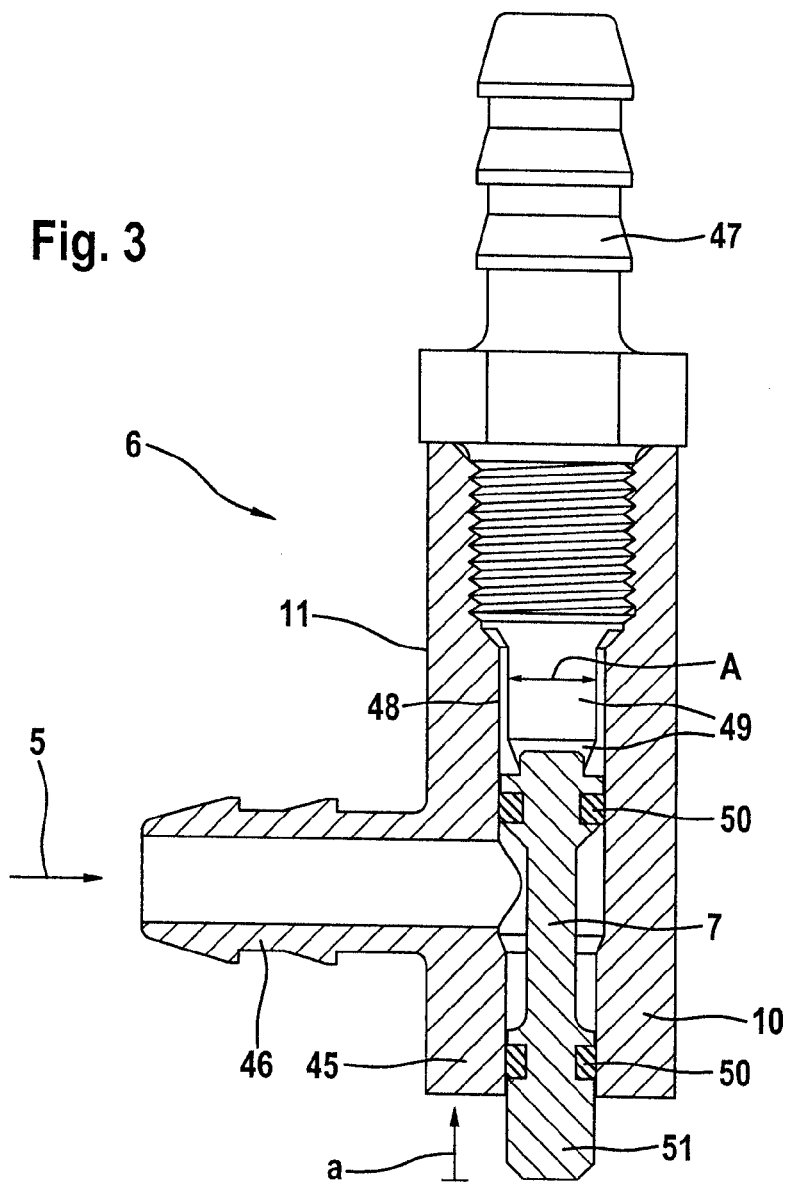
FIG. 3 is a longitudinal section illustration of a control valve configured as a globe valve.

FIG. 3 shows in a longitudinal section view the control valve 6 according to FIG. 2; it is a globe valve 10 with a cylindrical valve seat 48 in the illustrated embodiment. The globe valve 10 comprises a valve housing 45 having a unitary intake nipple 46 positioned at a right angle to the longitudinal axis of the valve housing. An outlet nipple 47 is screwed into the valve housing 45 at the end face in the longitudinal direction. In the interior of the valve housing 45, the valve body 7 is arranged; it rests seal-tightly with two axially spaced apart sealing rings 50 radially outwardly against the cylindrical valve seat 48. On the end of the valve body 7 opposite the outlet nipple 47, a pressure pin 51 is provided that projects from the valve housing 45. By means of the pressure pin 51, the valve body 7 can be axially moved away from its rest position by a positioning travel a. In the direction toward the outlet nipple 47, a radially extending depression is machined into the valve seat 48 for forming a valve opening 49 with a bent contour. When forcing the valve body 7 by means of the pressure pin 51 into the valve housing, the sealing ring 50 facing the outlet nipple 47 is moved into a position overlapping the valve opening 49. In this valve position, the water flow 5 can flow through the intake nipple 46 and the intermediate space between the two sealing rings 50 radially externally past the sealing ring 50 through the valve opening 49 and the outlet nipple 47. The contour of the valve opening 49 bent in the circumferential and radial directions is selected such that an opening cross-section A of the control valve 6 has a progressive characteristic line as a function of the positioning travel a.

Figure 4:
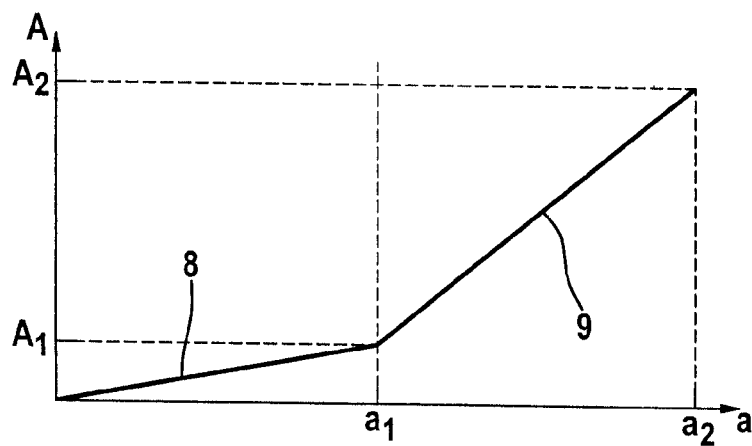
FIG. 4 shows the progressive characteristic line of the control valve according to FIG. 3 in a diagram form.

The characteristic line of the opening cross-section A dependent on the positioning travel a is illustrated in an exemplary fashion in the form of a diagram in FIG. 4. Accordingly, the progressive characteristic line comprises two at least approximately linearly extending portions 8, 9 that are progressively angled toward one another. The first portion 8 extends comparatively flat so that across a first positioning travel $a_1$—starting at the closed state—only minimal increase of the opening cross-section $A_1$ results. The second portion 9 of the characteristic line adjoins the first portion 8 at an angle so that upon further actuation of the valve body 7 up to a positioning travel $a_2$—because of the steeper course of the portion 9—a greater increase of the opening cross-section A up to the maximum opening cross-section $A_2$ results. It can be expedient to provide a curved progressive extension of the characteristic line.

In the embodiment according to FIG. 3, the valve body 7 is guided along a straight positioning travel a. It is also possible to provide a configuration for producing the progressive characteristic line (FIG. 4) where the valve body 7 is guided in a rotatable or pivotable way.

In the embodiment according to FIG. 3, the illustrated rest position of the valve body 7 is selected such that the sealing ring 50 in the area of the valve opening 49 rests about its entire circumference seal-tightly against the valve seat 48 and in this way interrupts the water flow 5 completely. The illustrated globe valve 10 is configured as a control valve 6 for adjusting the flow rate as well as a shut-off valve 11 for interrupting or releasing the water flow 5. Also, an arrangement can be expedient where the positioning travel a is adjusted such that the flow volume passing through is adjusted to be greater or smaller; a shut-off function is then assigned to a separate shut-off valve 11.

The two sealing rings 50 and the valve seat 48 externally surrounding them have an approximately uniform diameter. In the case of water pressure loading at the supply side through the intake nipple 46, the pressure forces acting in both axial directions on the valve body 7 compensate one another at least approximately. The actuating forces to be applied onto the pressure pin 51 are essentially independent of the water pressure that is present. The valve body 7 is designed such that its opening action away from its illustrated rest position is neutral relative to the admission pressure of the water pressure at the supply side. Closing of the valve body 7 can be realized, for example, actively by applying a tension force or by arrangement of a pressure spring (not illustrated to keep the drawing simple) drawings). A construction can also be expedient where flow through the globe valve 10 is directed in the opposite direction. The water pressure that is acting at the supply side on the valve body 7 loads the valve body 7 with a closing force against which the valve body 7 is to be opened away from its rest position; the pressure-caused closing force leads, as needed, to an automatic closing of the valve body 7.

Figure 5:
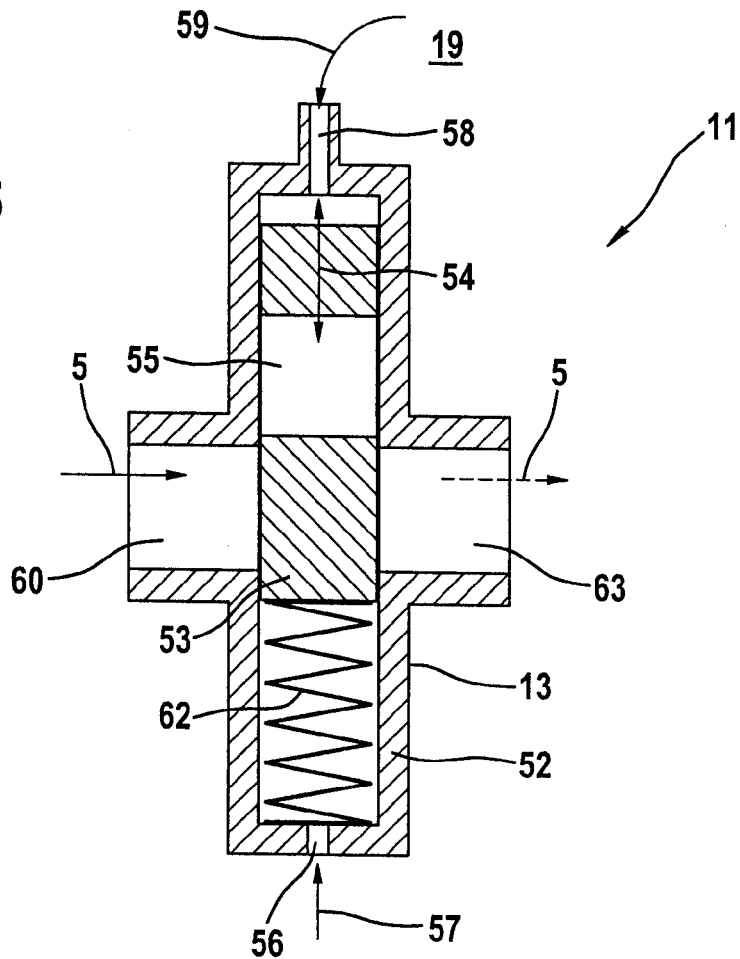
FIG. 5 is a schematic section illustration of a pneumatically actuated shut-off valve.

FIG. 5 shows in a schematic section illustration one embodiment of the shut-off valve 11 in the form of a mechanical 2/2-way valve 13. The valve housing 52 is provided with an intake opening 60 and an outlet opening 63 wherein a valve body 53 is arranged in the interior transversely to the water flow 5 and is movable in the direction of double arrow 54 against the force of a pressure spring 62. On the side of the pressure spring 62, a pressure opening 56 is provided in the valve housing 52 through which the interior is loaded by ambient pressure in accordance with the illustrated arrow 57. At the opposite end, a pressure opening 58 for pneumatic pressure loading of the valve body 53 in accordance with arrow 59 is provided in the valve housing 52. A pressure produced by the operation of the power tool 1 (FIG. 1), for example, pressure from the crankcase of an internal combustion engine, can be introduced through the pressure opening 58 so that the actuation of the shut-off valve 11 is coupled to the operation of the power tool 1. When applying an operating pressure in accordance with arrow 59, the valve body 53 is moved against the force of the pressure spring 62 such that the through opening 55 in the valve body 53 overlaps with the intake opening 60 and the outlet opening 63. In this way, the function of the shut-off valve 11 with an on/off function is provided without taking into consideration intermediate parameters. The disclosed pressure supply 59 acts thus as an on/off switch 19 as a function of operation of the power tool 1.

Figure 6:
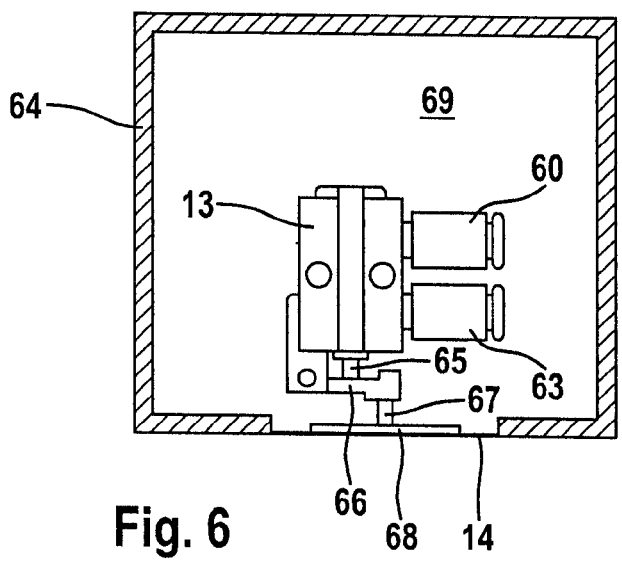
FIG. 6 shows details of an embodiment of the control valve according to FIG. 5 with a connected diaphragm in a schematic illustration.

FIG. 6 shows an embodiment of the schematically illustrated arrangement according to FIG. 5 in which the mechanical 2/2-way valve 13 is arranged in an exemplary fashion in a closed pressure chamber 64. In a wall of the pressure chamber 64 an elastic diaphragm 14 is inserted that transmits a force as a result of occurring pressure differences via a pressure plate 68, a plunger 67, and a lever 66 onto a pressure pin 65 of the valve 13. With minimal pressure differences at the diaphragm 14, in accordance with its large-surface area configuration and in connection with the lever action of the lever 66, high actuating forces can be exerted onto the pressure pin 65 and the passage from the intake opening 60 to the outlet opening 63 can be released. For this purpose, an external overpressure loading of the diaphragm 14 can be provided wherein an interior 69 of the pressure chamber 64 is loaded, for example, with atmospheric pressure. It can also be expedient to provide in the case of external ambient pressure the interior 69 with under pressure, for example, from the intake area of a carburetor. In the illustrated embodiment, the crankcase pressure of the drive motor 32 (FIG. 1) is selected as the pneumatic control signal that actuates the valve 13 by means of the diaphragm 14. The crankcase pressure is generated only upon operation of the drive motor 32 and is thus an operating signal that indicates running of the drive motor 32 and releases the water flow through the valve 32.

Figure 7:
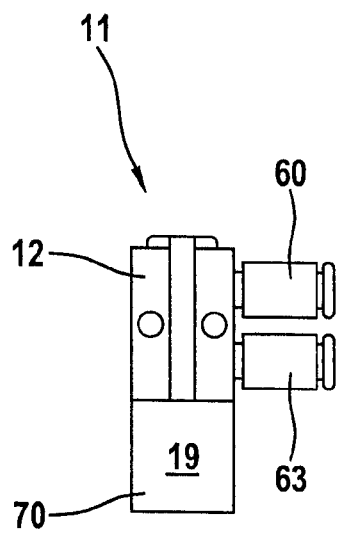
FIG. 7 is a variant of the valve according to FIG. 6 in an embodiment as a 2/2-way solenoid valve.

FIG. 7 shows in a schematic illustration a variant of the shut-off valve 11 according to FIGS. 5 and 6 that is embodied as an solenoid valve 12. In an exemplary fashion, a configuration as a 2/2-way valve is provided. The valve body with the intake opening 60 and the outlet opening 63 matches the configuration of FIG. 6 while for operating it a schematically indicated solenoid 70 is provided. The solenoid 70 can be, for example, connected to an ignition coil or to another electric device of the drive motor 32 (FIG. 1) so that an on/off switch is provided that is coupled to the operation of the power tool 1 (FIG. 1).

Figure 8:
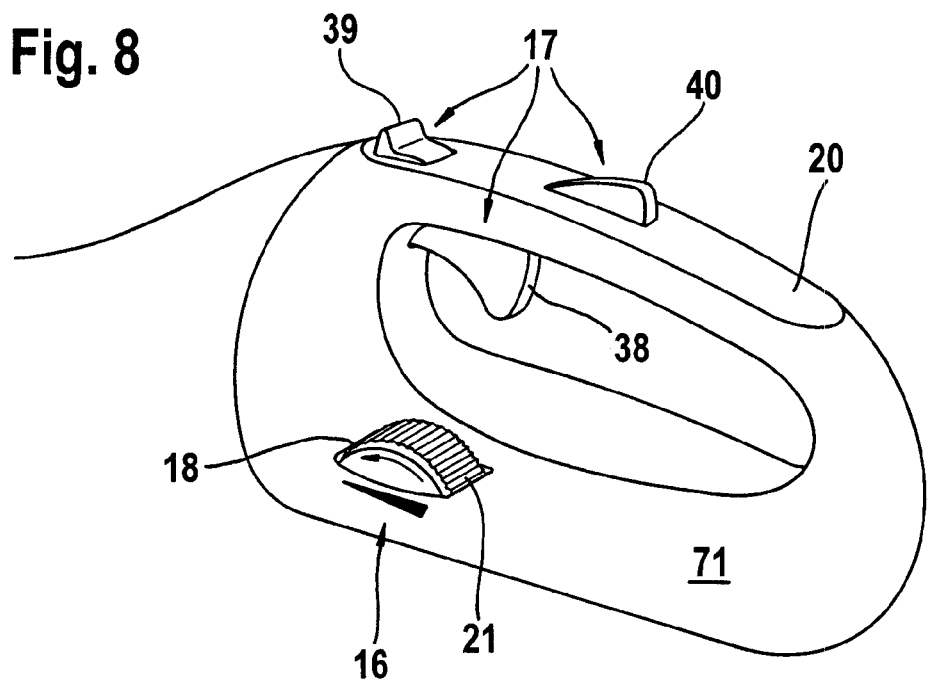
FIG. 8 shows in a schematic perspective illustration the handle arrangement of the power tool according to FIG. 1 with a laterally arranged setting roller for actuating the valve arrangement according to FIG. 2.

FIG. 8 shows in a schematic perspective illustration the area of the first handle 20 of the power tool 1 according to FIG. 1. On the handle 20, a throttle trigger 38 for adjusting the motor output, a stop lever 39 for turning off the drive motor 32, as well as a throttle trigger lock 40 for preventing accidental operation of the throttle trigger 38 are arranged as control elements 17 for operating the drive motor 32 (FIG. 1). A part of the actuator 16 in the form of actuating element 18 is arranged in the area of the first handle 20. A further part of the actuator 16, not illustrated, for example in the form of an on/off switch 19 (FIG. 2), can be arranged e.g. on the second handle 30 or at another location of the power tool 1 (FIG. 1). In the illustrated embodiment, the control element 18 is configured as a setting roller 21 partially recessed into the handle housing 71. An axis of rotation (not illustrated) of the setting roller 21 is positioned within the handle housing 71 and extends transversely underneath the first handle 20.

Figure 9:
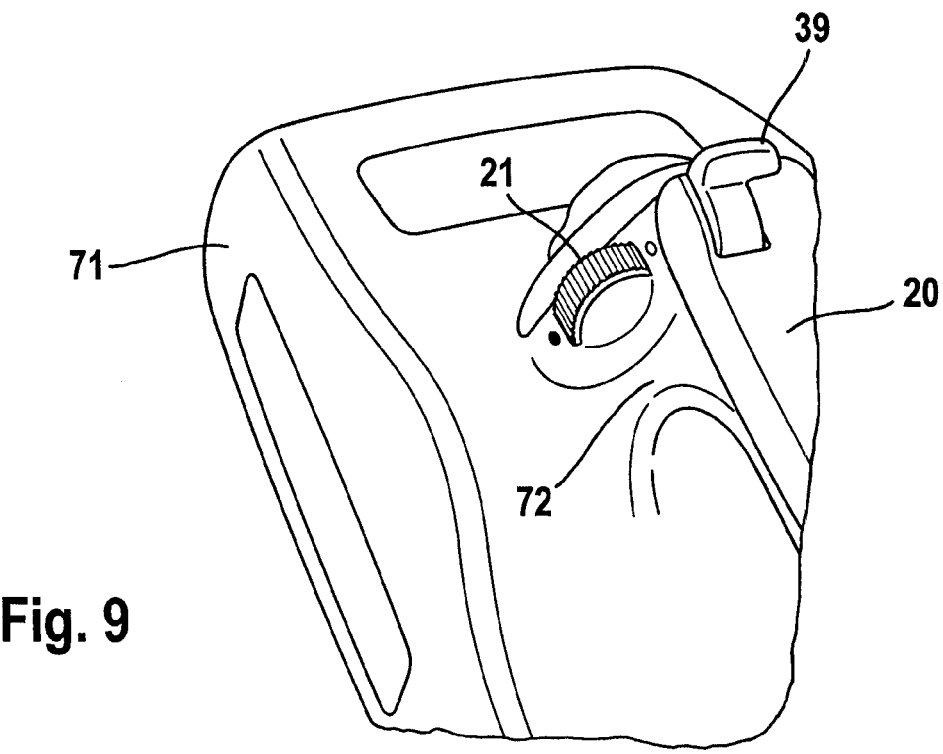
FIG. 9 is a variant of the arrangement according to FIG. 8 with a setting roller positioned transversely to the handle axis.

FIG. 9 shows a variant of the arrangement according to FIG. 8 in which the setting roller 21 is arranged laterally in the forward area of the first handle 20 wherein the axis of rotation of the setting roller 21 extends axis-parallel to the axis of the first handle 20.

In the embodiment according to FIG. 10, an actuating element 18 in the form of a pivotable setting lever 25 is provided in the forward lateral area of the first handle 20; it has an axle stub that projects at least partially outwardly from the handle housing and has an axis of rotation 24. The actuating element 18 can be actuated by means of the setting lever 25 as well as by means of the projecting axle stub.

A further variant is illustrated in FIG. 11 in which the actuating element 18 is configured as a setting slide 23; in the illustrated embodiment, it extends slidably in a curved groove 22. It is also possible to provide a linearly movable setting slide 23. The axis of rotation 24 according to FIG. 10 and the pivot axis according to FIG. 11 are positioned approximately perpendicularly to the longitudinal axis of the first handle 20 wherein the two axes at least approximately intercept one another, respectively. The arrangement of the actuating element 18 according to FIGS. 8 through 11 is selected such that in the usual operating position they can be actuated by the thumb of a hand gripping the handle 20 without having to reposition the hand.

Figure 12:
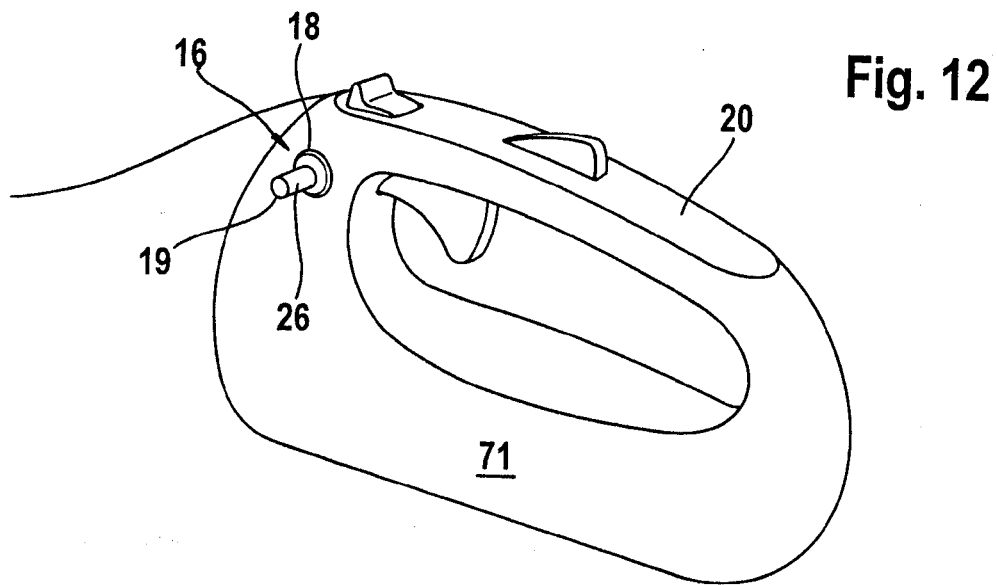
FIG. 12 shows a further handle arrangement variant with a pushbutton as an on/off switch and an actuating element for adjusting the water rate.

The same holds true also for the embodiment according to FIG. 12 in which the actuator 16 is arranged together with the actuating element 18 and the on/off switch 19 laterally relative to the handle 20 approximately at the level of its longitudinal axis. The actuator 16 has an actuating knob 26 that can be pushed in axially in a direction transversely to the longitudinal axis of the handle 20; it is surrounded annularly by the actuating element 18.

Figure 13:
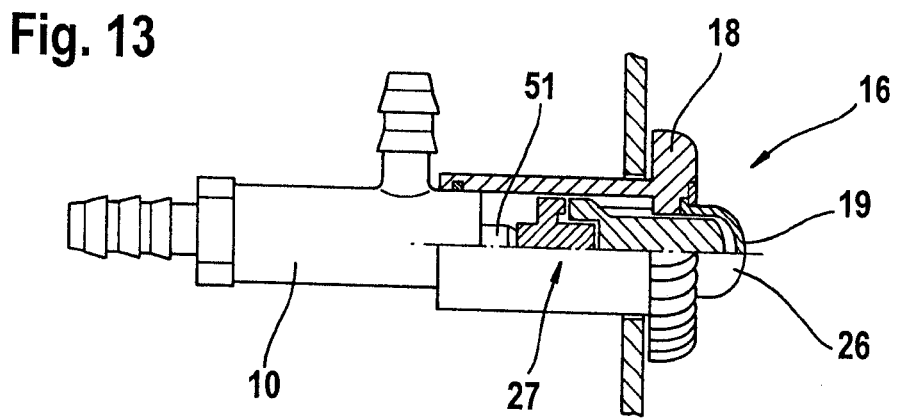
FIG. 13 shows in an enlarged detail view the arrangement according to FIG. 12 in the area of the pushbutton and the actuating element in connection with the globe valve of FIG. 3.

FIG. 13 shows in a partially sectioned illustration details of the actuator 16 according to FIG. 12; here the actuator 16 is connected directly to the globe valve 10 according to FIG. 3. The actuating knob 26 is part of the on/off switch 19 which is in the form of a pushbutton 27 that can be switched between two switching positions for actuating the globe valve 10. By means of the ring-shaped actuating element 18 surrounding the pushbutton 27, the positioning travel a (FIG. 3) of the globe valve 10 can be preadjusted. By alternatingly pushing the pushbutton 27 in accordance with a known ballpoint pen mechanism the pressure pin 51 is moved in and out alternatingly. The valve body 7 (FIG. 3) can thus be switched between its closed position and its open position that is preadjusted by means of the actuating element 18.

Figure 14:
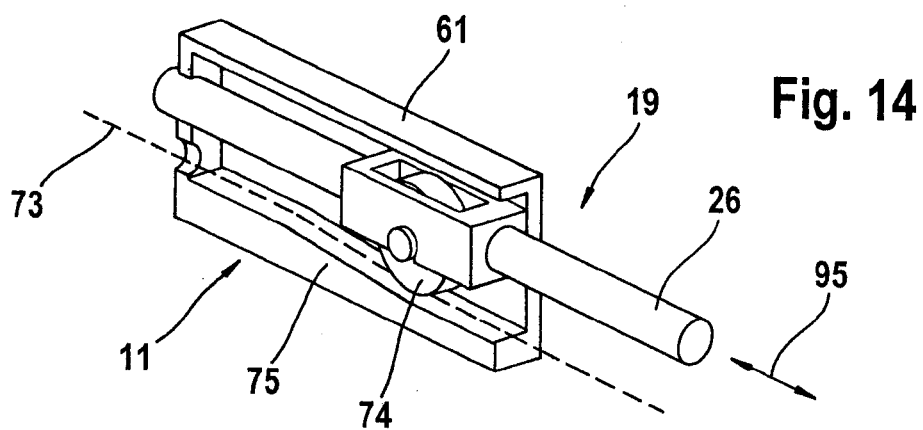
FIG. 14 shows in a perspective view an embodiment of the shut-off valve in the form of a hose roller clamp.

For controlling the water flow 5 (FIG. 1), it can also be provided that the valve arrangement 4, for example, comprises a hose clamp 61 according to FIG. 14. The perspective illustration of FIG. 14 illustrates that the hose clamp 61 for forming a roller clamp has a roller 74 that is movable by means of the actuating knob 26 (FIG. 12) in the direction of the double arrow 95. The actuating knob 26 is embodied as a continuous rod that projects, for example, in the embodiment according to FIG. 12, alternatingly from one or the other lateral surface of the handle housing 71. A hose line 73, indicated by a dashed line, extends between the roller 74 and a ramp 75 of the hose clamp 61. By axial displacement of the actuating knob 26, the roller 74 rolls on the hose line 73 so that, depending on the axial positioning travel in connection with the slanted shape of the ramp 75, pinching of the hose line 73 to a greater or lesser degree results. Depending on the axial adjustment of the actuating knob 26, the flow-conducting cross-section of the hose line 73 is adjustable, wherein the illustrated embodiment of the hose clamp 61 in connection with the actuating knob 26 as an on/off switch is embodied in combination with shut-off valve 11. It can also be expedient to configure the hose clamp 61 as a control valve 6 (FIG. 2) with progressive characteristic line (FIG. 4), in particular in connection with a corresponding shaping of the ramp 75.

Figure 15:
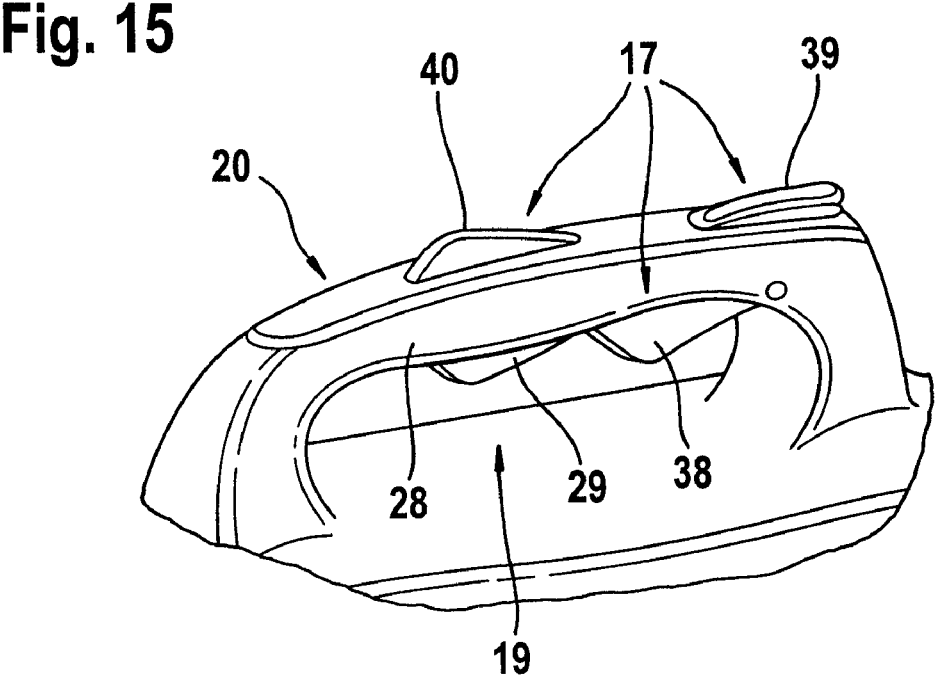
FIG. 15 shows in a perspective view an embodiment of the handle arrangement of the power tool according to FIG. 1 with a pivot lever projecting from the surface of the handle.

FIG. 15 shows an embodiment of a handle arrangement of the power tool 1 according to FIG. 1 in which the on/off switch 19 is additionally arranged directly on the handle 20 separate from the control elements 17. The on/off switch 19 is embodied as a pivot lever 29 arranged on the bottom side of the handle 20 and projecting from a surface 28 of the handle 20. Independent of the lever 38, the stop lever 39, and the throttle trigger lock 40, the pivot lever 29 can be actuated, for example, by the little finger when the hand grips the handle 20.

Figure 16:
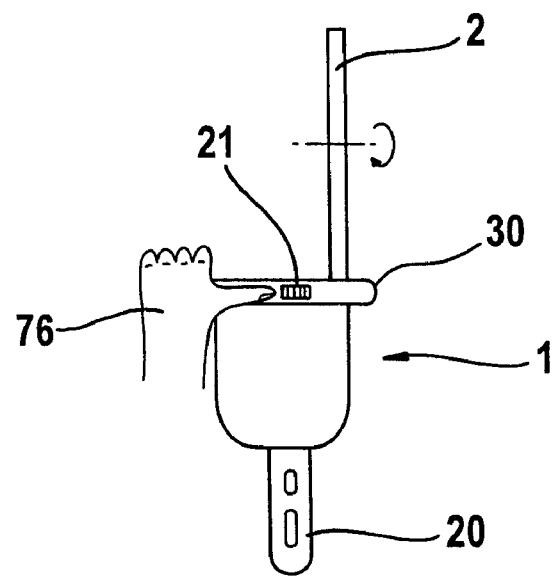
FIG. 16 shows in a schematic illustration a plan view of an embodiment with a setting roller integrated into a grip pipe.

FIG. 16 shows in a schematic illustration a plan view of a variant of the power tool 1 according to FIG. 1 wherein a setting roller 21 is arranged on the second handle 30 that is arranged between the first handle 20 and the cutting wheel 2. The axis of rotation of the setting roller 21 is positioned axis-parallel to the axis of the first handle 20 or transversely to the axis of the second handle 30. Its actuating direction extends in the direction of an extended thumb of the hand 76 gripping the second handle 30 and can be actuated easily by flexing movements of the thumb.

Figure 17:
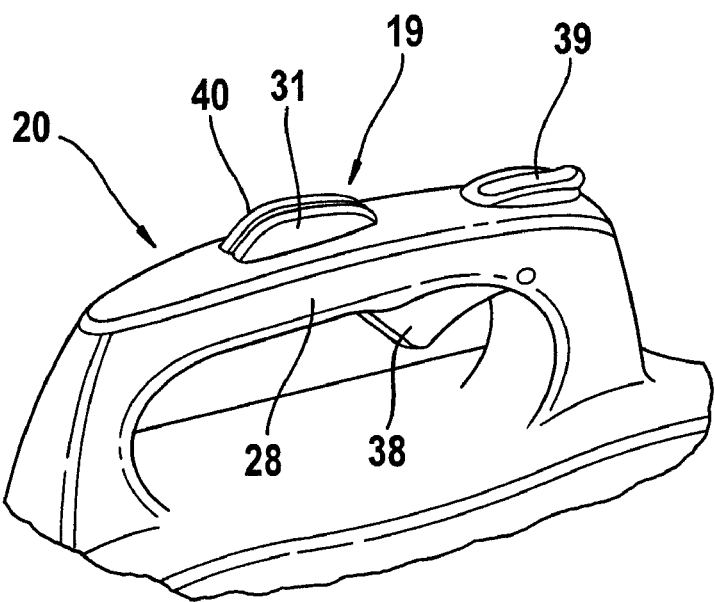
FIG. 17 shows in a perspective illustration a variant of the grip arrangement of the power tool according to FIG. 1 with two parallel extending levers for separate configuration of the pivot lever for water control and the throttle trigger lock.

According to FIG. 17, an embodiment of the handle 20 is provided in which the on/off switch 19 is a push switch 31 and is positioned for actuation of the shut-off valve 11 (FIG. 2) directly adjacent the throttle trigger lock 48 that is shaped identically. The pivot lever 29 and the throttle trigger lock 40 project upwardly from the surface 28 of the handle 20. Upon gripping the handle 20 with one hand and upon subsequent lifting of the power tool 1 (FIG. 1), the power tool 1 is ready for operation wherein, as a result of the pressure applied by the hand, the throttle trigger lock 40 and the push switch 31 are simultaneously and automatically suppressed as a function of the operating readiness of the power tool. The water flow 5 (FIG. 2) is released. As needed, by means of the throttle trigger 38 the motor output can be increased or, after completion of the working process, can be turned off by the stop lever 39 of the power tool 32 (FIG. 1). After releasing the hand from the handle 20, the push switch 31 automatically returns, for example, as a result of a spring force, into its initial position; the water supply is interrupted.

Figure 18:
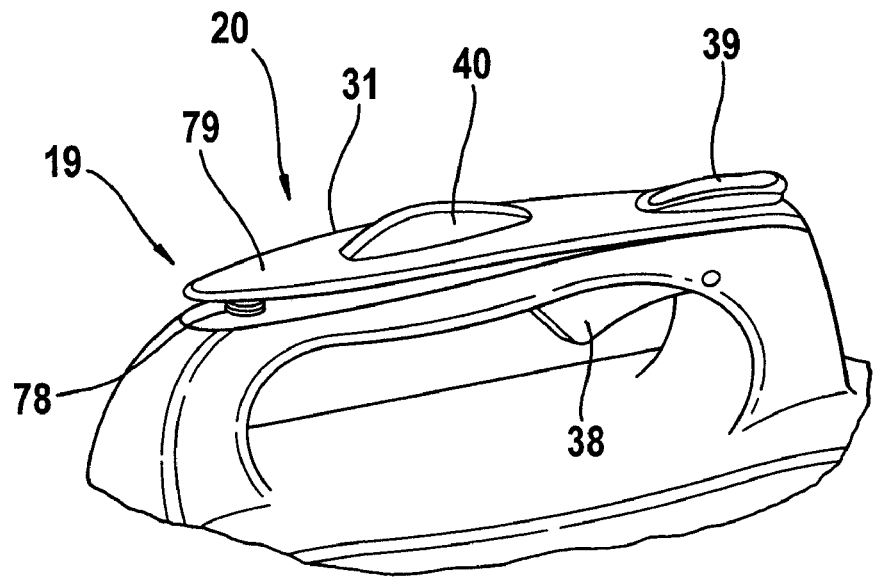
FIG. 18 is a variant of the embodiment of FIG. 17 with a rocker switch integrated into the handle.

FIG. 18 shows a variant of the arrangement according to FIG. 17 in which the on/off switch 19 comprises a push switch 31 that is embodied as an elastic springy rocker switch 79 on the topside of the handle 20. The rocker switch 79 is actuatable against the pressure of an intermediately positioned pressure spring 78. With regard to its function, the rocker switch 79 corresponds to the push switch 31 according to FIG. 17.

Figure 19:
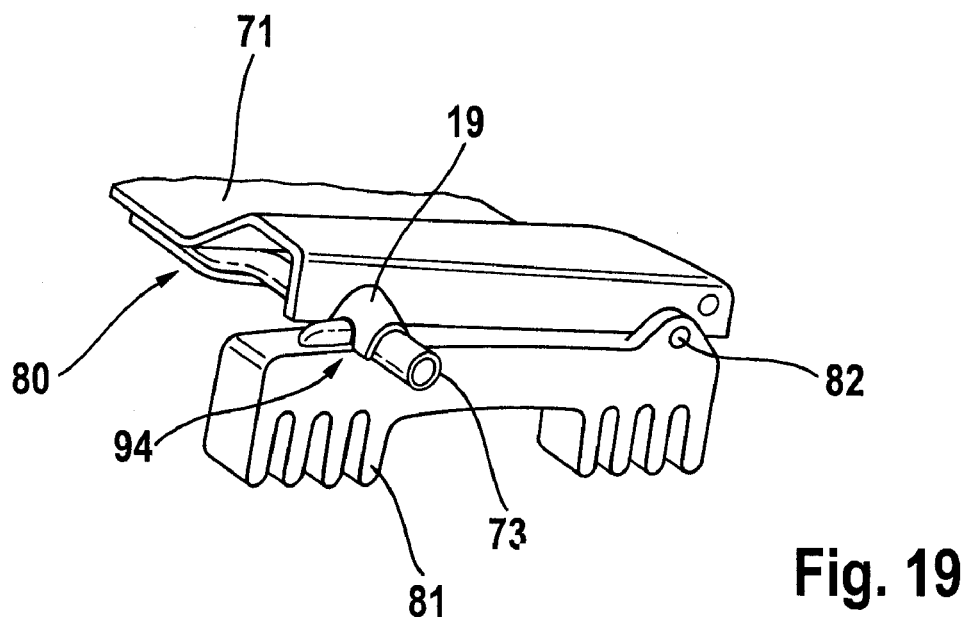
FIG. 19 shows in a perspective detail view a section of the support surface of a power tool according to FIG. 1 with the pivotably supported support leg and an integrated on/off switch in the form of a hose clamp.

FIG. 19 shows in a detail illustration the area of the support surface of the power tool 1 according to FIG. 1 with a support leg 81. The support leg 81 is pivotably supported about pivot axis 82; a hose line 73 extends between support leg 81 and the handle housing 71. When setting down the power tool 1 (FIG. 1), the weight acting on the support leg 81 causes a pivot movement that leads to pinching of the hose line 73. The pinching action is released when lifting the power tool 1. The power tool 1 is ready to operate and the free cross-section of the hose line 73 is released. The water flow 5 (FIG. 1) can flow through the hose line 73; in the illustrated arrangement an on/off switch 19 in the form of a hose clamp 94 is formed.

Figure 20:
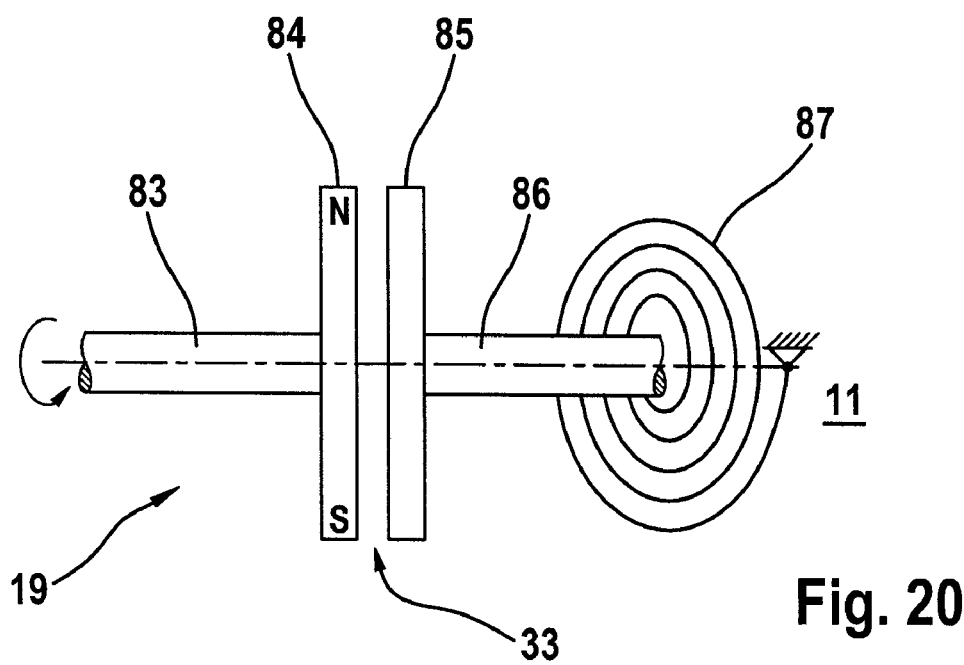
FIG. 20 shows in a schematic illustration a magnetic clutch as a part of an on/off switch.
Figure 21:
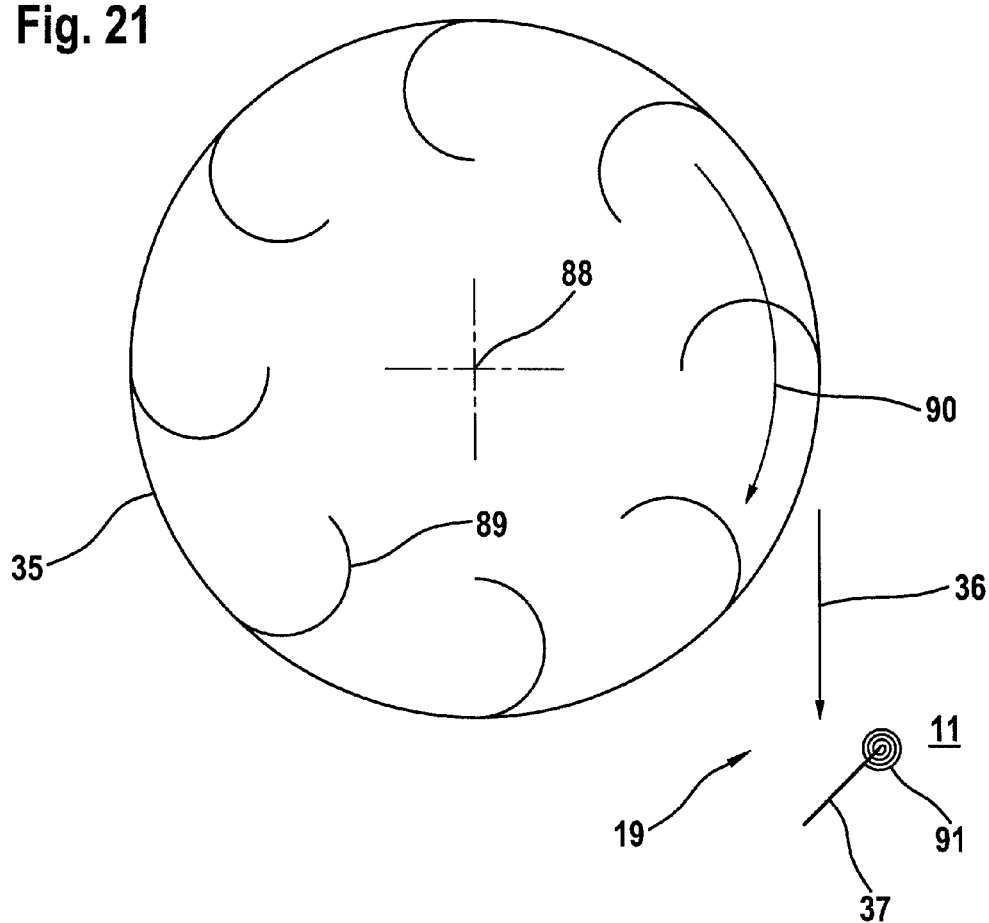
FIG. 21 is a schematic illustration of an airflow-loaded vane for actuating an on/off switch.
Figure 22:
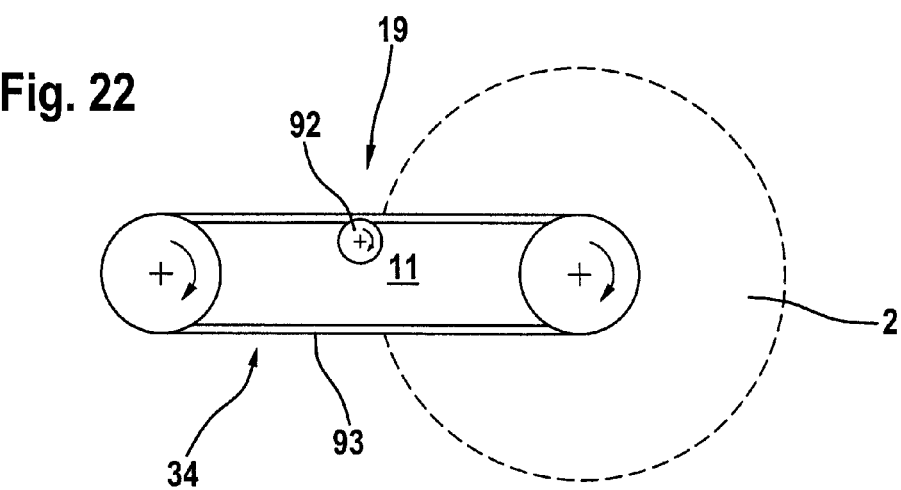
FIG. 22 shows in a schematic side view the belt drive of the power tool according to FIG. 1 with a connected roller for operation-triggered actuation of the on/off switch of the water supply.

FIGS. 20 to 22 show in schematic illustrations embodiments in which the on/off switch 19 is actuatable by a part of the power tool (FIG. 1) that moves upon operation of the power tool. In the embodiment according to FIG. 20 the on/off switch 19 is a magnetic clutch 33 coupled to a part of the power tool 1 that rotates during operation of the power tool. Instead of the magnetic clutch it is also possible to employ an eddy current clutch, an eddy current brake or similar devices. The part rotating during operation is for example a shaft 83 that can be a crankshaft of the drive motor 32 or a bearing shaft of the cutting wheel 2 (FIG. 1). A magnet 84 is provided on the shaft 83 and is rotated at a spacing past an iron plate 85. The iron plate 85 is pivotably supported on a shaft 86 against the restoring moment of a spiral spring 87. When a constructively predetermined speed of the magnet 84 is reached, a suitable pivot moment is transmitted onto the iron plate 85; this is sufficient for actuating the schematically illustrated shut-off valve 11.

According to FIG. 21, an embodiment is provided in which the power tool 1 in operation generates an airflow 36. In the illustrated embodiment, a fan wheel 35 of the drive motor 32 (FIG. 1) is provided that, together with the schematically illustrated vane configuration 89, can be driven in rotation in the direction of arrow 90 about an axis of rotation 88. The airflow 36 for cooling the drive motor 32 is generated as a result of the rotational movement. The vane 37 is exposed to the air flow 36. The vane 37 is supported to be pivotable against the restoring moment of a spiral spring 91 so that by means of the vane 37 a schematically illustrated on/off switch 19 can be actuated. The blower arrangement in combination with the airflow 36 and the vane 37 forms the on/off switch 19 whose function, as in the embodiment according to FIG. 20, is coupled to the operation of the power tool 1 (FIG. 1).

FIG. 22 shows a detail of the area of the belt drive 34 with cutting wheel 2 of the power tool 1 according to FIG. 1, wherein a roller 92 runs on the belt 93 of the belt drive 34. At a limit speed preset by operating conditions, an actuation of the schematically shown shut-off valve 11 is realized by means of the roller 92 so that an on/off switch 19 is formed. Instead of the roller 92 it is also possible to provide a gliding element or similar means that interacts with the belt drive 34.

While specific embodiments of the invention have been shown and described in detail to illustrate the inventive principles, it will be understood that the invention may be embodied otherwise without departing from such principles.

What is claimed is:

1. A water supplying device of a tool of a hand-held power tool driven by a drive motor, the device comprising:
   a water-conveying line conveying water to the tool;
   a valve arrangement arranged in the water-conveying line for controlling a water flow flowing through the water-conveying line to the tool;
   an actuator acting on the valve arrangement;
   wherein the valve arrangement comprises a shut-off valve; and
   wherein the actuator comprises an on/off switch, wherein switching on and switching off of the on/off switch to switch on and off a supply of water to the tool, respectively, is caused by a weight force of the power tool.

2. The device according to claim 1, wherein the water-conveying line comprises a hose line extending between a support leg and a handle housing of the device in such a way that the on/off switch is in the form of a hose clamp.

3. The device according to claim 2, wherein the support leg is supported on the handle housing so as to be pivotable about a pivot axis such that when the device is set down the weight force acting on the support leg causes a pivot movement that leads to pinching of the hose line.

4. The device according to claim 1, comprising a handle on which the on/off switch is arranged, wherein the on/off switch is a push switch, wherein the push switch is configured to be switched by pressure applied manually in response to the weight force when lifting the device.

5. The device according to claim 1, wherein the valve arrangement further comprises a control valve that is connected flow-conductingly in series to the shut-off valve.

6. The device according to claim 5, wherein the shut-off valve is arranged upstream of the control valve.

7. The device according to claim 5, wherein the actuator comprises an actuating element for actuating the control valve and comprises, separate from the actuating element, the on/off switch for actuating the shut-off valve.

8. The device according to claim 7, wherein the control valve comprises a valve body that is adjustable across a positioning travel, wherein an opening cross-section of the control valve, as a function of the positioning travel, has a progressive characteristic line.

9. The device according to claim 7, wherein the control valve has a valve body, wherein the valve body is configured to have an opening action away from a rest position of the valve body which opening action is neutral relative to an admission pressure of the water pressure at a supply side of the control valve.

10. The device according to claim 1, comprising control elements that control the drive motor, wherein the control elements are separate from the actuator comprising the on/off switch and acting on the valve arrangement.

11. The device according to claim 1 in the form of a cutoff-machine, wherein the tool is a cutting wheel.

* * * * *